United States Patent
Kantz et al.

(10) Patent No.: US 6,574,744 B1
(45) Date of Patent: Jun. 3, 2003

(54) METHOD OF DETERMINING A UNIFORM GLOBAL VIEW OF THE SYSTEM STATUS OF A DISTRIBUTED COMPUTER NETWORK

(75) Inventors: Heinz Kantz, Vienna (AT); Oliver Scheck, Vienna (AT); Peter Metzner, Vienna (AT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/356,520

(22) Filed: Jul. 19, 1999

(30) Foreign Application Priority Data

Jul. 15, 1998 (DE) .......................... 198 31 720

(51) Int. Cl.⁷ ................................ H04L 1/22
(52) U.S. Cl. ........................... 714/1; 709/200
(58) Field of Search ............... 709/248, 204, 709/205, 251, 224; 714/1, 3, 10–12, 21

(56) References Cited

U.S. PATENT DOCUMENTS 3,848,116 A * 11/1974 Moder et al. .................. 714/3
3,921,149 A * 11/1975 Kreis et al. ................. 709/400

(List continued on next page.)

FOREIGN PATENT DOCUMENTS

| DE | EP 246218 A2 | * | 11/1987 | ............ G06F/11/18 |
| DE | 197 45 963 A1 | | 4/1999 | |
| DE | EP 0 674 601 A2 | * | 1/2000 | ............ G06F/11/00 |
| EP | 0 246 218 A2 | | 11/1987 | |
| EP | 258654 A2 | * | 9/1988 | ............ H04Q/3/66 |
| EP | 0 902 369 A2 | | 3/1999 | |
| EP | 0 905 623 A2 | | 3/1999 | |
| EP | 0 910 018 A2 | | 4/1999 | |
| EP | 0 913 759 A2 | | 5/1999 | |

OTHER PUBLICATIONS

Hopkins, Jr. et al., "FTMP–A Highly Relicable Fault–Tolerant Multiprocessor for Aircraft", IEEE, 1978, pp. 1221–1239.*
Guerraoui et al., "Total Order Multicast to Multiple Groups*", IEEE, 1997, pp. 578–585.*

(List continued on next page.)

*Primary Examiner*—Bunjob Jaroenchonwanit
(74) *Attorney, Agent, or Firm*—Sughrue Mion, PLLC (57) ABSTRACT

A method of determining a uniform global view (GS) of the system status of a distributed computer network (VRNW) comprising at least three computers (R1, R2, R3) is provided in that the computers exchange messages over communication links (KV12, KV13, KV32) in successive transmission rounds, with each of the computers receiving a message from each of the other computers in each transmission round in the absence of an error. In each transmission round, each of the computers evaluates messages received from the other computers and, based on the result of the evaluation, assigns one of at least three differently defined computer states to each of the other computers and determines a local view (LS) of the system status therefrom. The computers exchange the local views of the system status determined by them, and each of the computers determines a uniform global view (GS) of the system status from the local views exchanged.

2 Claims, 6 Drawing Sheets

U.S. PATENT DOCUMENTS

| | | | | |
|---|---|---|---|---|
| 4,375,683 A | * | 3/1983 | Wensley | 326/11 |
| 4,521,745 A | * | 6/1985 | Falconer | 331/2 |
| 4,583,224 A | * | 4/1986 | Ishii et al. | 714/10 |
| 4,754,400 A | * | 6/1988 | Wakahara et al. | 714/1 |
| 4,789,795 A | * | 12/1988 | Christiaan | 307/401 |
| 4,907,232 A | * | 3/1990 | Harper et al. | 714/11 |
| 4,967,347 A | * | 10/1990 | Smith et al. | 714/12 |
| 5,003,533 A | * | 3/1991 | Watanabe | 370/258 |
| 5,157,667 A | * | 10/1992 | Carusone et al. | 340/29.1 |
| 5,327,553 A | * | 7/1994 | Jewett et al. | 714/3 |
| 5,339,404 A | * | 8/1994 | Vandling, III | 714/1 |
| 5,423,024 A | | 6/1995 | Cheung | |
| 5,438,680 A | * | 8/1995 | Sullivan | 709/248 |
| 5,535,217 A | * | 7/1996 | Cheung et al. | 709/248 |
| 5,761,439 A | * | 6/1998 | Kar et al. | 709/248 |
| 5,864,657 A | * | 1/1999 | Stiffler | 711/135 |
| 5,903,717 A | * | 5/1999 | Wardrop | 714/12 |
| 6,035,416 A | * | 3/2000 | Abdelnour et al. | 714/10 |
| 6,134,673 A | * | 10/2000 | Chrabaszcz | 714/11 |
| 6,223,304 B1 | * | 4/2001 | Kling et al. | 714/12 |
| 6,295,541 B1 | * | 9/2001 | Bodnar et al. | 707/203 |
| 6,308,223 B1 | * | 10/2001 | Opgenoorth | 709/248 |
| 6,370,571 B1 | * | 4/2002 | Medin, Jr. | 709/218 |
| 6,442,694 B1 | * | 8/2002 | Bergman et al. | 709/224 |

OTHER PUBLICATIONS

Lamport et al., "Synchronizing Clocks in the Presence of Faults", Journal of the Association for Computing Machinary, vol. 32, No. 1, Jan. 1985 pp. 52–78.*

Weinstock, "SIFT: System Design and Implementation", IEEE, 1996, pp. 29–30.*

Wensley, "Fault–Tolerant Computers Industrial–control system does things in threes for safety", electronics, Jan.–1983, pp. 98–102.*

"Countdown for Space Shuttle Velocity, Altitude Regimes To Push Computer Limits", Aviation Week&Space Technology, Apr. 1981, pp. 49–51.*

Cooper et al., "Development of On–board Space Computer Systems", On–Board Computer Evaluiation, Jan. 1976, pp. 5–19.*

Sklaroff, "Redundancy Management technique for Space Shuttle computers", IBM J. Res. Develop., pp. 20–28.*

Moser, et al., "Total Ordering Algorithms", ACM, 1991, pp. 375–380.*

"Membership Algorithms for Asynchronous Distributed Systems", $11^{th}$ Conf, on Distributed Computing Systems, Arlington, TX, USA, May 1991, pp. 480–488.

SIEWIOREK, Daniel P.: "Architecture of Fault–Tolerant Computers: An Historical Perspective" Proceedings of the IEEE, vol. 79, No. 12, Dec. 1991, pp. 1710–1734; vgl.insb, S. 1729, Space Shuttle.

* cited by examiner

METHOD OF DETERMINING A UNIFORM GLOBAL VIEW OF THE SYSTEM STATUS OF A DISTRIBUTED COMPUTER NETWORK

This invention relates to a method of determining a uniform global view of the system status of a distributed computer network comprising at least three computers. The invention further relates to a distributed computer network for carrying out the method.

INTRODUCTION

In distributed computer networks, changes in system status occasionally occur as a result of intended events (e.g., addition of a new computer) or unintended events (e.g., failure of a computer). On the occurrence of such a change, it must be ensured that the computers in the computer network get a uniform global view of the new system status as quickly as possible. The problem of how to bring about a uniform global view of the system status is frequently also referred to as a "membership problem".

This membership problem is particularly important in distributed computer networks which are used to monitor and control processes critical with regard to safety, such as in railway signaling or in power plant technology. In such computer networks, the individual computers compare their results. Results are output to the process only if they were determined independently of each other by a majority of the computers. If, in a network of three computers, for example, one of the computers fails, the other two computers can continue to deliver results to the process. This requires, however, that these two computers have come to a uniform global view of the system status, i.e., there must be agreement upon which of the computers has failed and which of the computers are free from faults.

From a publication by L. E. Moser et al entitled "Membership Algorithms for Asynchronous Distributed Systems", 11th Int. Conf. on Distributed Computing Systems, Arlington, Tex., USA, May 1991, pages 480–488, different algorithms for solving the membership problem in an uncoupled distributed computer network are known. These algorithms are based on a failure hypothesis according to which the computers send either no messages or correct messages. The case where a computer sends erroneous messages is not assumed. The algorithms described use messages whose transmission is repeated if a receiver has not received the message. In addition, there are messages whose transmission is not repeated in such a case. This latter group includes, for example, the request messages, by which a computer notifies the other computers that it wants to become a member again. Admission to such a request is granted by the other computers via specific grant messages. The algorithms described there are limited to uncoupled computer networks and cannot readily be applied to synchronous or virtually synchronous distributed networks.

OBJECT

It is therefore an object of the invention to provide a method of determining a uniform global view of the system status of a synchronous or virtually synchronous distributed computer network comprising at least three computers. Another object of the invention is to provide a distributed computer network for carrying out the method.

SUMMARY OF THE INVENTION

These objects are attained, according to the invention, by a system wherein communication among the computers is implemented in the form of transmission rounds. A transmission round is characterized in that in in such a round, each of the computers receives a message from each of the other computers in the absence of an error. Each of the computers evaluates the messages received from the other computers and, based on the result of the evaluation, assigns one of at least three differently defined computer states to each of the other computers. In this manner, each computer determines its own local view of the system status. The computers exchange these local views. Each computer then determines a global view of the system status from the received local views, for example by subjecting the local views to a majority decision. As all of the computers have the same local views, they all come to the same global view of the system status.

This method places no exacting requirements on the synchrony of the transmission. It only requires that within a period of time which need not be fixed but must be finite and limited, each of the computers has received a message from each of the other computers. The method can thus be used with communications protocols according to which computers may send only during permanently assigned time slots, but also with a few communications protocols where such a fixed assignment does not exist.

Furthermore, use of the method according to the invention requires no specific sequences of operations to start up the distributed computer network, whereby the complexity of the computer network is reduced significantly.

Further advantageous features of the invention, will be apparent from the description below and the appended claims.

BRIEF DESCRIPTION OF THE DRAWINGS

The invention will become more apparent from the following description of embodiments to be read in conjunction with the accompanying drawings, in which.

DETAILED DESCRIPTION OF THE INVENTION

Figure 1:
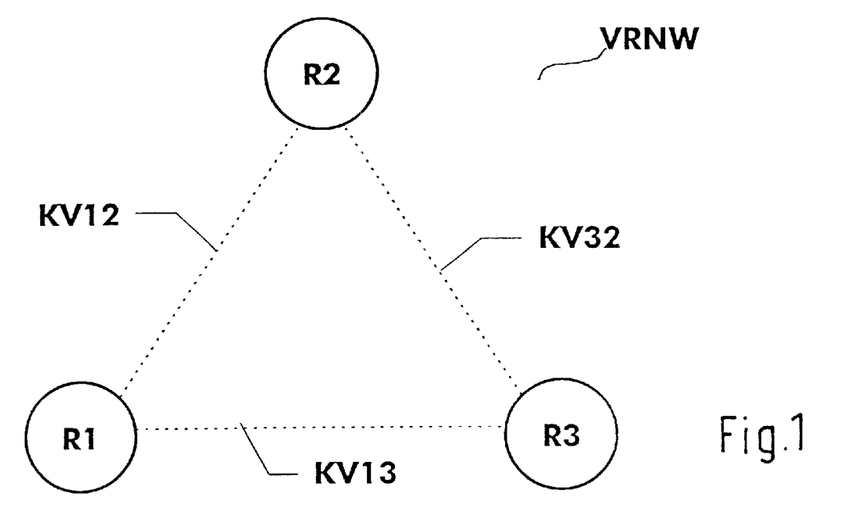
FIG. 1 shows a distributed computer network with three computers R1, R2, and R3.

FIG. 1 shows a distributed computer network VRNW comprising three computers R1, R2, and R3. The computers R, . . . , R3 are interconnected by communication links KV12, KV13, and KV32 in such a way that each of the computers can communicate with each of the other computers in the computer network. In FIG. 1, these communication links are represented as physical point-to-point connections. In many cases, however, it will be more advantageous to have the computers R1, . . . , R3 communicate over a data bus.

The communications protocol governing the communication between the computers R1, . . . , R3 is packet-oriented and makes it possible to selectively address message packets—hereinafter called "messages" for short—to individual computers. The addressee is in a position to identify the sender with the aid of the message. In addition, the communications protocol is so designed that messages are exchanged in the form of transmission rounds. A transmission round is characterized in that in such a round, each of the computers receives a message from each of the other computers in the absence of an error. The term "transmission round" will now be explained in more detail with reference to FIG. 2 as well as to FIGS. 3a and 3b.

Figure 2:
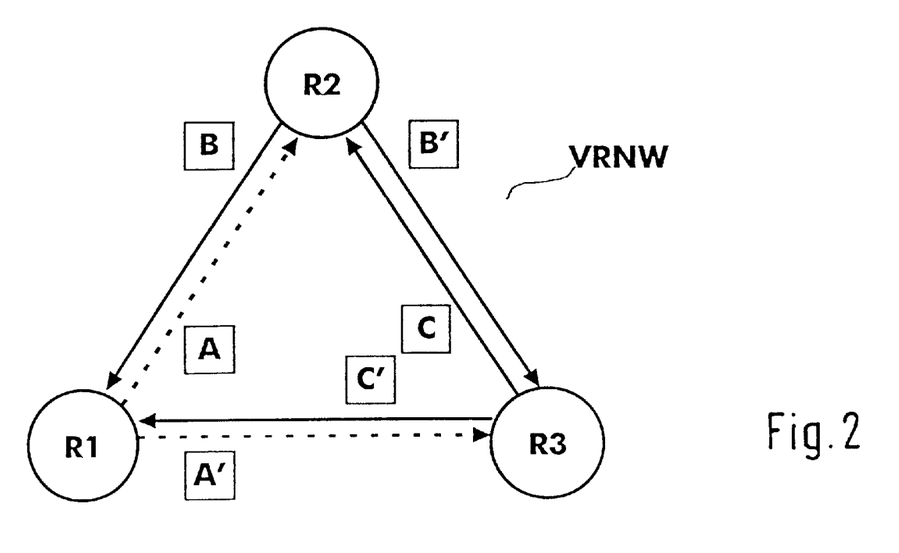
FIG. 2 is a sketch serving to explain the term "transmission round"
Figure 3A:
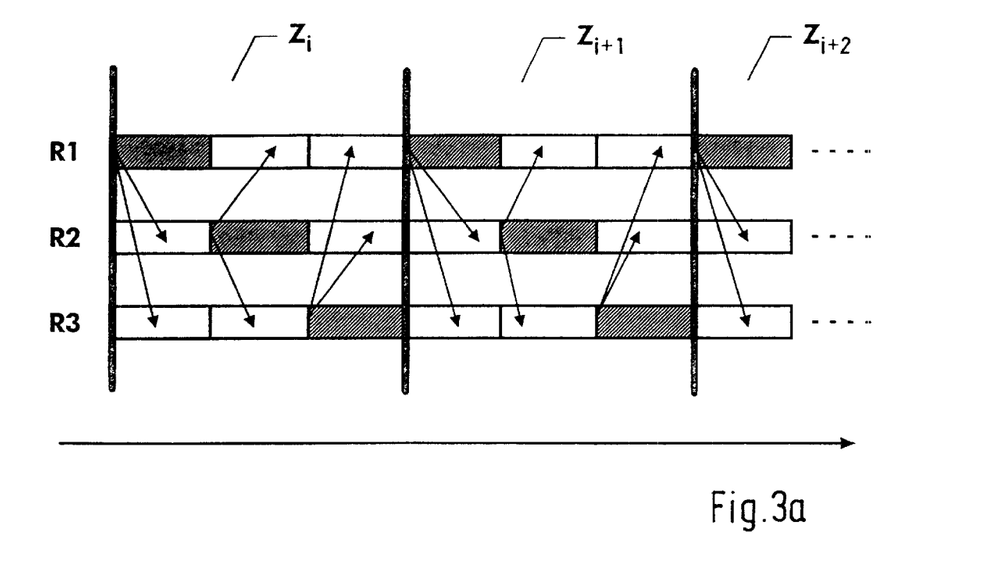
FIG. 3a is a sketch serving to explain the term "transmission round" if a strictly synchronous communications protocol is used.

FIG. 2 shows schematically the procedure for a transmission round in the distributed computer network VRNW of FIG. 1. It is assumed that computer R1 sends messages A and A' to the two other computers R2 and R3, respectively. The messages A and A' may be different or identical. Computers R2 and R3 respond to the reception of the messages A and A', respectively, by transmitting messages B, B' and C, C', respectively. This results in a state in which each of the computers has received a message from each of the other computers. How the exchange of the messages is implemented depends on the communications protocol used. FIG. 3a shows schematically the procedure for transmission rounds in a tightly coupled synchronous distributed computer network. The time axis is divided into a plurality of cycles $Z_i$ whose limits are marked in FIG. 3a by grey bars. In each cycle, each computer is assigned a time slot during which it may send messages over the communication links. For the timing of the time slots assigned to them, the computers must have a common time base.

In cycle $Z_i$, the first time slot is assigned to computer R1. It therefore begins to send messages to the other two computers R2 and R3. Due to possibly different propagation delays, the messages are received by the other computers R2 and R3 not simultaneously, but still within the time slot assigned to computer R1. The next time slot in cycle $Z_i$ is assigned to computer R2, which now sends messages to the other computers, i.e., to computer R1 and computer R3. Computer R3 proceeds analogously. At the end of cycle $Z_i$, each of the computers has received a message from each of the other computers. The subsequent cycles $Z_{i+1}$ and $Z_{i+2}$ follow the same pattern.

Figure 3B:
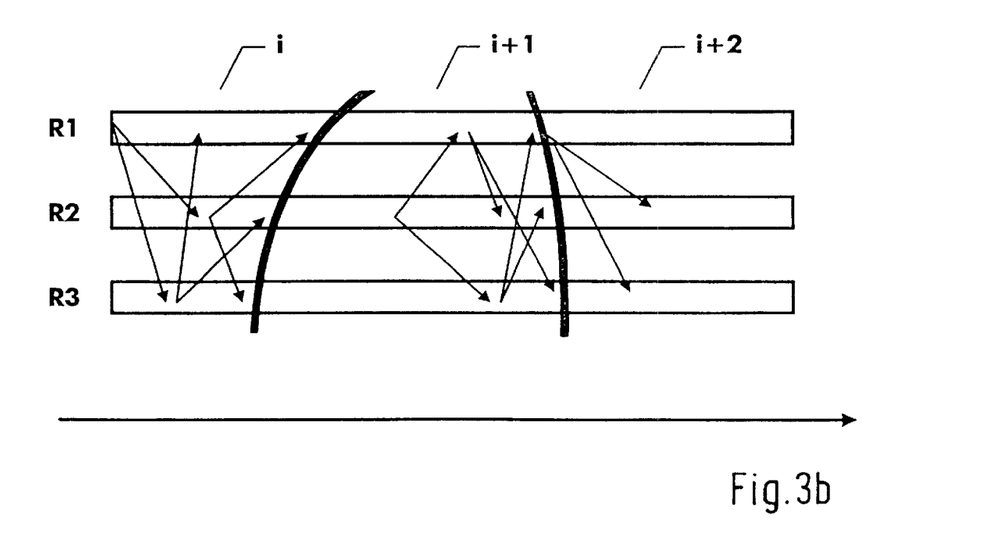
FIG. 3b is a sketch serving to explain the term "transmission round" if a virtually synchronous communications protocol is used.

The procedure of transmission rounds depicted in FIG. 3b is based on a virtually synchronous, loosely coupled distributed computer network, which does not require a common time base. In the embodiment shown, the first transmission round i is initiated by computer R1 sending messages to the two other computers R2 and R3. As soon as the two other computers R2 and R3 have received the messages, they, in turn, send messages to the other computers R1, R3 and R1, R2, respectively. Here, however, no time slots within which the computers may send messages and within which the messages must be received are fixed. Coupling between the computers thus exists only insofar as the computers R2 and R3 respond to the reception of the message from computer R1 with the transmission of messages of their own.

In this virtually synchronous computer network, too, a transmission round is complete when each of the computers has received a message from each of the other computers. This point of time is generally different for each computer; this is indicated by the curved vertical bar. If, for example, computer R3 received no message from computer R2, the transmission round would not be complete for computer R3 until after expiration of a defined waiting time.

In this virtually synchronous distributed computer network, unlike the synchronous computer network described above, any of the computers can initiate a transmission round. The next transmission round i+1 can therefore be initiated by computer R2, for example, as shown in FIG. 2b. In this transmission round i+1, computer R1 is the first to detect the end of the round. Hence, it can already initiate the next transmission round n+2 although transmission round n+1 has not yet been completed for the other two computers.

Three Computer States

According to the invention, in each transmission round, each of the computers evaluates messages received from the other computers and, based on the result of the evaluation, assigns one of at least three differently defined computer states to each of the other computers. In a first embodiment of the invention, a received message can be assigned to one of the three following categories:

(a) Member message: Is sent by a computer which is a member. A member responds reliably in each transmission round with the transmission of messages of its own when it has received a message.

(b) Applicant message: Is sent by a computer which is not yet a member but wants to become one.

(c) Null message: Either no message has been received or the receiving computer has determined by evaluation of an error-detecting code that the received message is corrupted.

A computer which has received a message from another computer will now assign one of the three following computer states to the sending computer depending on which of these categories the message belongs to:

(a) "Member" (abbreviation: m). A computer which has sent a member message.

(b) "Applicant" (abbreviation: a). A computer which has sent an applicant message.

(c) "Nonmember" (abbreviation: n). A computer which has sent a null message.

Figure 4:
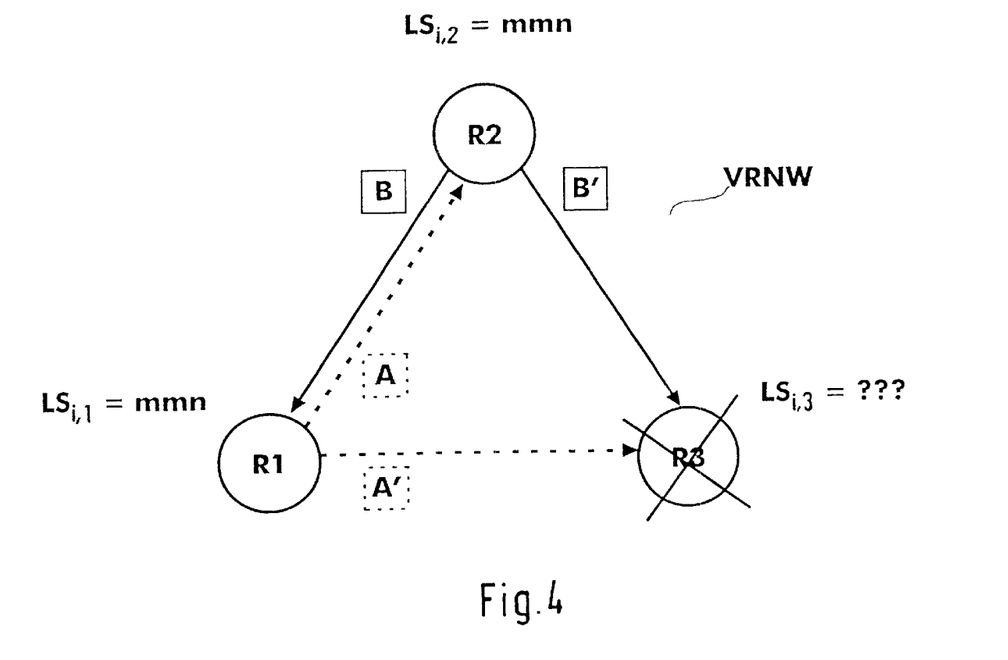
FIG. 4 shows a distributed computer network with a faulty computer to explain the method in accordance with the invention.

In the example sketched in FIG. 4, computer R1 has started a transmission round i, which is indicated by the dashed arrows. Computer R3 is faulty; therefore, it sends a message neither to computer R1 nor to computer R2. The computers R1 and R2 interpret this as "null messages" and, consequently, assign the state "nonmember" (n) to the faulty computer R3. As the computers R1 and R2 have successfully exchanged member messages A and B, they classify each other as "members" (m). In addition, computers R1 and R2 consider themselves to be members.

These computer states are composed by each of the computers into a local view of the distributed computer network. Thus, in the local view determined by computer R1 in transmission round i (abbreviated: $LS_{i,1}$), computers R1 and R2 are members (m), while computer R3 is a nonmember (n). This is symbolized in FIG. 4 by the expression $LS_{i,1}$=mmn. The local view determined by computer R2 in transmission round i (abbreviated: $LS_{i,2}$) is also mmn. Computer R3 has received a member message from all other computers and could regard itself and the other computers as members. However, computer R3 could just as well be so seriously faulty as to be unable to determine a local view of the system status at all. For this reason, the local view determined by computer R3 is designated by the expression "???".

Figure 5:
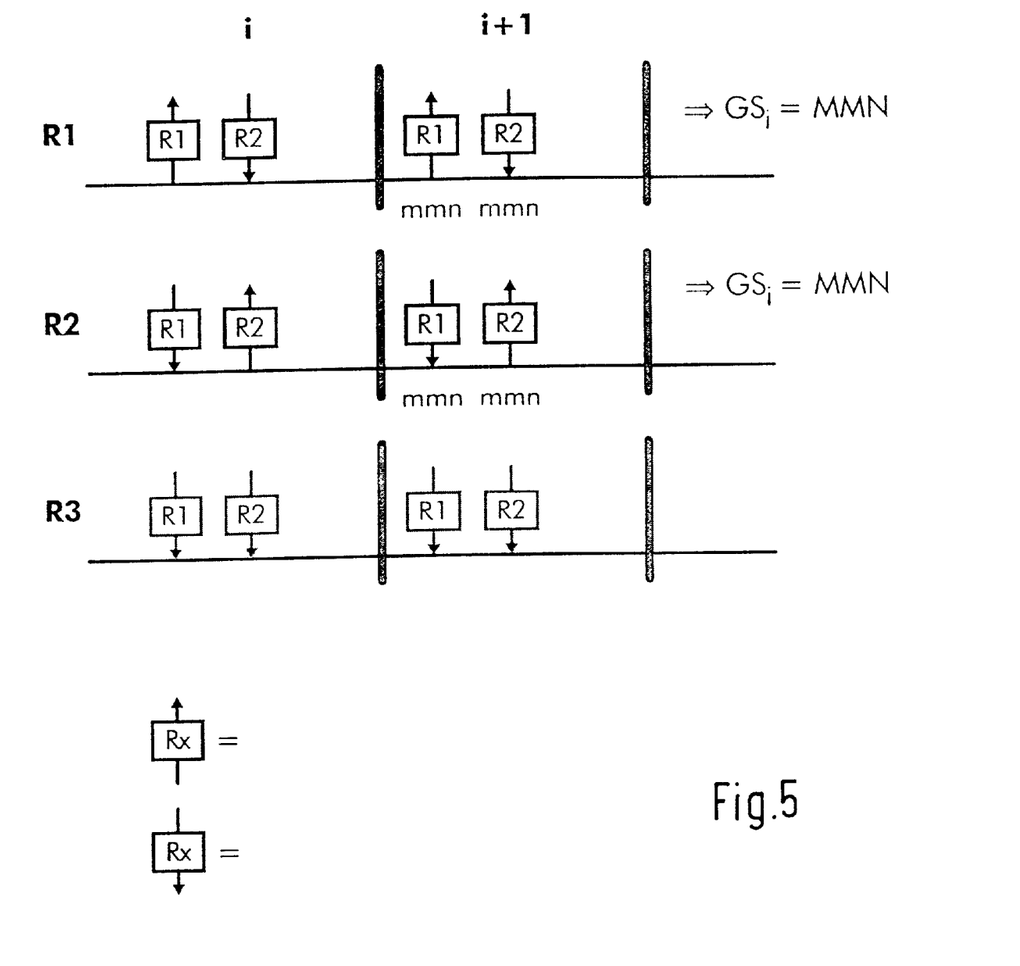
FIG. 5 shows the procedure according to the invention for transmission rounds in a distributed computer network as shown in FIG. 4.

In the next transmission round i+1, according to the invention, the three computers Rx, x=1, 2, or 3, exchange the local views $LS_{i,x}$ determined by them in round i. FIG. 5 shows this in a schematic representation. In transmission round i, only computers R1 and R2, but not the faulty computer R2, send messages. In transmission round i+1, computers R1 and R2 send messages which inform a receiver of the respective local view determined by the sender for the preceding transmission round i. Thus, at the end of transmission round i+1, each of the two computers R1 and R2 has its own view and the local view determined by the respective other computer. Since computer R3 does not send a message in transmission round i+1, either, it cannot notify the other computers of its local view of the system status, provided such a local view has been determined.

Through the exchange of local views, the method according to the invention ensures that at the end of transmission round i+1, at least each correctly functioning computer holds the same local views. If all computers determine a global view of the system status from the local views according to the same rule, it is reliably ensured that these global views are identical and, thus, uniform. Therefore, the following speaks only of one global view $GS_i$ for transmission round i.

One possible rule for determining a global view from the individual local views is to subject the local views to a simple majority decision. This means that in the global view, a computer is assigned that computer state in which the computer is in the majority of the local views. In the above example with only two local views, which are identical, the result is, of course:

| | |
|---|---|
| $LS_{i,1}$: | m m n |
| $LS_{i,2}$: | m m n |
| $GS_i$: | M M N | where capital letters denote a computer state in a global view. If the faulty computer R3 sent its local view to the two other computers R1 and R2 in transmission round i+1, this would not alter the global view of these computers, since they would still be in the majority:

| | |
|---|---|
| $LS_{i,1}$: | m m n |
| $LS_{i,2}$: | m m n |
| $LS_{i,3}$: | ? ? ? |
| $GS_i$: | M M N |

This also shows that the global view of the system status in transmission round i cannot be determined before the next transmission round i+1 is complete, i.e., before the local views of round i have been exchanged.

The simple majority decision just explained can be replaced by a more qualified majority decision. For example, in a distributed computer network with five computers, it could be agreed that in the global view, a computer is regarded as a member (M) only if it is a member (m) in not only three local views, but in at least four local views. On the other hand, under certain circumstances, less than a simple majority decision may be required; reference is made to the below-explained embodiment in which four computer states are defined.

In the determination of the global views, not only the local views exchanged, but also the global view of a preceding transmission round may be taken into account. It may be agreed, for example, that only the local views of those computers which were members in the last determined global view are taken into account. Likewise it may be agreed that it depends on the last determined global view what category of messages a computer may send. An example of this will be explained later.

The procedure according to the invention preferably extends to all transmission rounds, i.e., in each transmission round, local views are exchanged between the computers. Depending on the respective application, however, it is also conceivable to perform the determination of local views and their subsequent exchange only in response to a particular initiation signal or at (major) fixed intervals (e.g., every tenth transmission round). The exchange of local views is independent of the exchange of other messages.

Figure 6:
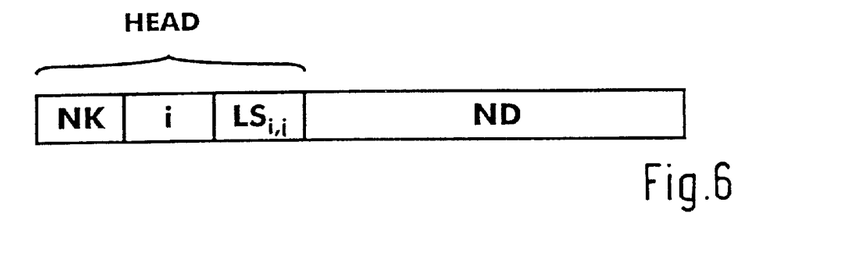
FIG. 6 shows the structure of a message according to the invention as claimed in claim 2.

In a preferred embodiment, the messages exchanged between the computers all have the format shown in FIG. 6. Each message comprises a header HEAD which contains the following information:

(a) message category NK;

(b) number i of the transmission round; and (c) local view $LS_{i,j}$ of the system status, determined by computer j in transmission round i.

If required by the application being executed by the distributed computer network, the messages may include a payload ND. If—as shown in FIG. 4, for example—a computer sends messages A and A' to all other computers in a transmission round, these messages A and A' may only differ in their payloads ND. The header HEAD, however, must be identical in both messages, since otherwise no uniform view of the system status can be determined.

Fault Tolerance

If, as shown in FIG. 4, each of the computers receives precisely one message from each of the other computers in a transmission round, the above-described method according to the invention can be used to reliably determine a uniform global view of the system status if the fault in a computer can be assigned to one of the two following error classes:

1. The computer is sending no messages at all.

2. The computer is sending erroneous messages, with the error manifesting itself to all other computers in the same manner, however.

Figure 7:
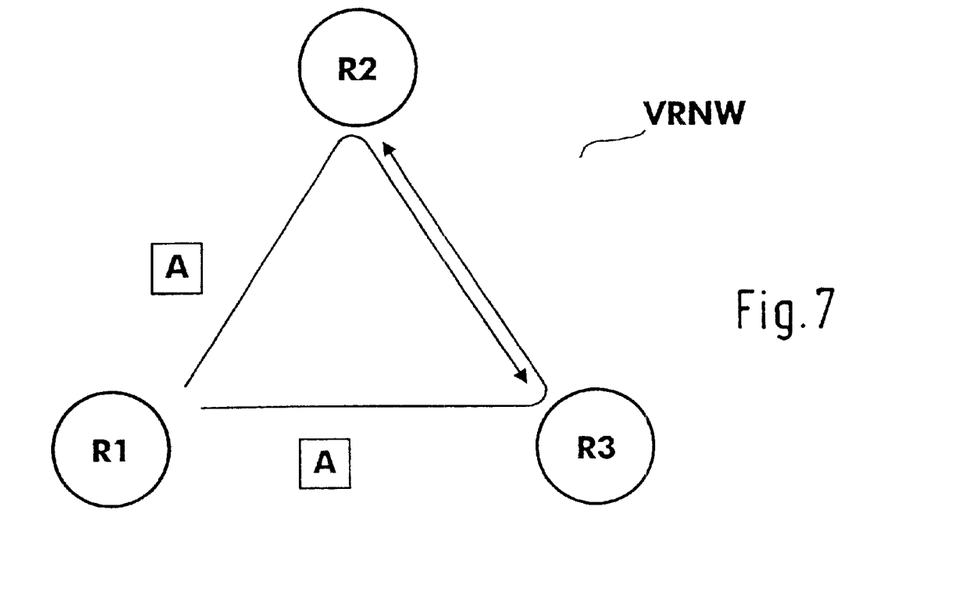
FIG. 7 shows a distributed computer network to explain an embodiment as claimed in claim 5.

The method according to the invention can be used to advantage with a communications protocol which ensures that a data packet sent by any of the computers to the other computers is forwarded by these other computers in such a way that in the absence of an error, each of the other computers will receive this data packet at least twice. This will now be explained in more detail with reference to FIG. 7. In the distributed computer network shown in FIG. 7, computer R1 sends identical messages A to computers R2 and R3. Computer R2 receives the message A and forwards it to computer R3 unchanged. Computer R3 handles the message received from computer R1 in the same way. In this manner, each of computers R2 and R3 receives the message A twice, namely directly from computer R1 and indirectly via computers R3 and R2, respectively.

With such a communications protocol, the method according to the invention can be used to determine a uniform global view of the system status even if the fault in a computer can be assigned to a third error class. In this error class, as in the above-mentioned 2nd error class, the faulty computer sends erroneous messages. However, the fault may manifest itself to the other computers in different ways (so-called Byzantine fault).

Figure 8:
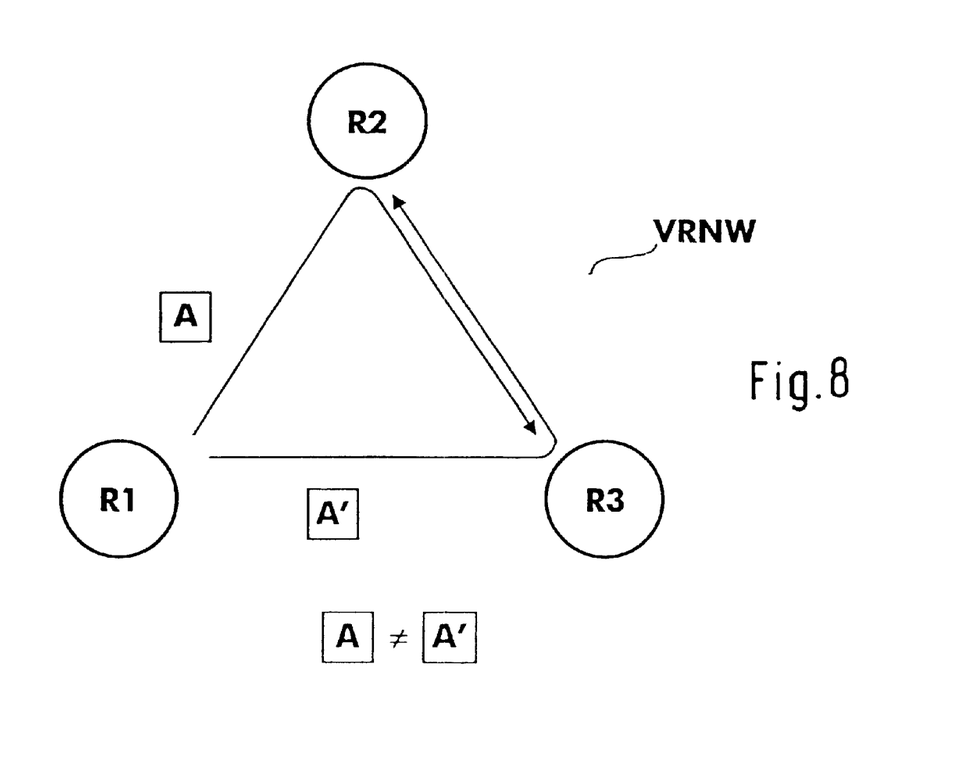
FIG. 8 shows a distributed computer network in which a Byzantine fault has occurred.

Such a fault scenario is sketched in FIG. 8. Computer R1 is faulty and generates different messages A and A' instead of identical messages. Both messages are provided with "correct" error-detecting codes, so that the two other computers R2 and R3 cannot detect any error. If, however, the communications protocol ensures in the above-mentioned manner that the messages are forwarded, then computer R2, for example, will determine that message A, received directly from computer R1, is not identical with message A', received via computer R3. Computer R3 will make a corresponding determination. Because of this discrepancy, in the local views determined by the two correctly functioning computers R2 and R3, computer R1 will be regarded as a nonmember. It is only assumed that no errors occur during the forwarding of messages; otherwise it could no longer be distinguished for computer R2, for example, whether computer R1 has sent different messages or whether computer R3 has corrupted a message A received from computer R1 into a message A'.

If such a communications protocol is used, a uniform global view of the system status can be determined even if a communication link between the computers is faulty. If, for example, the link between computers R1 and R2 in FIG. 7 fails, the two affected computers R1 and R2 can continue to exchange messages via computer R3. If the path the messages have taken is additionally specified in the messages, then, as is readily apparent, all computers can determine which of the communication links is faulty.

Four Computer States

In a preferred embodiment, the computers are assigned four rather than three differently defined states. Accordingly, there are four differently defined message categories:

(a) Member message (abbreviation: mb): Is sent by a computer which is a member. A member responds reliably in each transmission round with the transmission of own messages when it has received a message.

(b) Bind message (abbreviation: bind): Is sent by a computer which is not yet a member but is already regarded as an applicant (see below) in the global view.

(c) Boot message (abbreviation: boot): Is sent by a computer which is in a booting process or has completed such a process.

(d) Null message (abbreviation: null): Either no message has been received or the receiving computer has determined by evaluating an error-detecting code that the received message is corrupted.

The following four computer states correspond to these four different message categories:

(a) "Member" (abbreviation: m). A computer which has sent a member message.

(b) "Preliminary member" (abbreviation: p): A member which has sent a bind message.

(c) "Applicant" (abbreviation: a): A computer which has sent a boot message.

(d) "Nonmember" (abbreviation: n): A computer which has sent a null message.

The meanings of these message categories and of the computer states as well as the advantages resulting from these definitions will now be illustrated by an example.

Booting of a Distributed Computer Network

Figure 9:
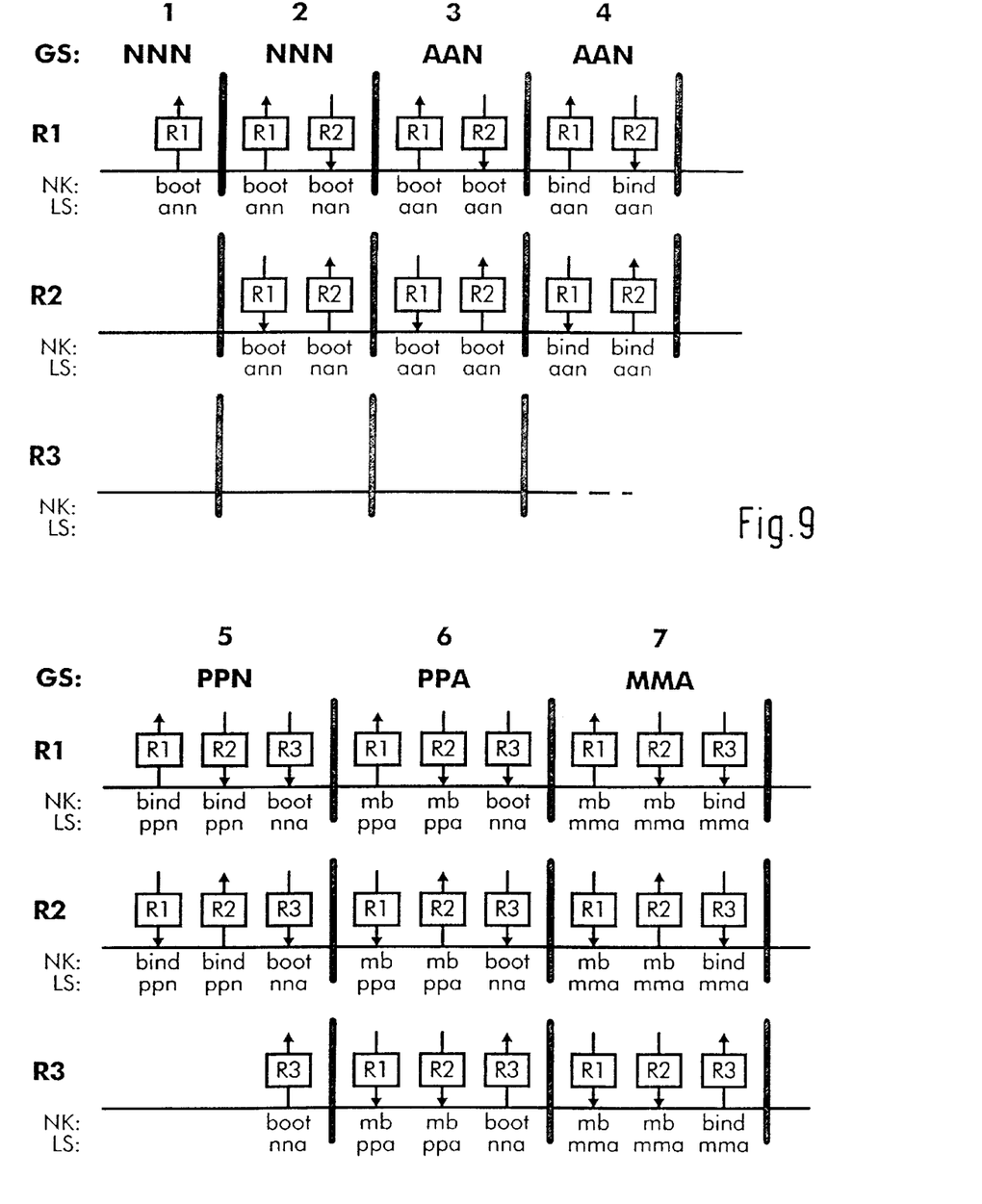
FIG. 9 shows the procedure according to the invention for transmission rounds during the booting of a distributed computer network in which four computer states are defined.

FIG. 9 shows schematically how a uniform global view of the system status can be determined with four computer states even while booting the distributed computer network. In this example it is assumed that the computer R1 boots first, followed directly by computer R2, and some time later by computer R3. Consequently, the first transmission round 1 begins with a boot message (boot) sent by computer R1 to the other computers. In FIG. 9, the respective message categories NK as well as the respective local views LS determined by the computers are given. Also given are the global views determined by the computers.

As computer R1 cannot have received any messages from other computers, it assigns the state "nonmember" (n) to these computers. It regards itself as an applicant (a), since it sends a boot message. As no other local view is available yet, a majority decision automatically yields the lowest possible global system status, namely $GS_i$=NNN.

In transmission round 2, computer R1 sends a boot message in addition to computer R2. Therefore, computers R1 and R2 assign to each other the state "applicant" (a), so that the local views are $LS_{2,1}$=$LS_{2,2}$=aan. From the preceding transmission round, only one local view is available, so that a majority decision on the local views cannot produce a result. Hence, the global system status remains NNN.

In transmission round 3, computers R1 and R2 send boot messages again and exchange their local views determined in the preceding transmission round 2. As the two local views are identical, both computers determine the global view as $GS_3$=AAN.

Since, in the global view, both computer R1 and computer R2 are applicants, they can send bind messages (bind) in the next transmission round, i.e., round 4. Upon reception of bind messages, computers R1 and R2 assign to each other the computer state "preliminary member" (p), so that the local views exchanged by these two computers in transmission round 5 are $LS_{4,1}$=$LS_{4,2}$=ppn.

In transmission round 5, the computers still send bind messages, since in the previously determined global view, they were still applicants (A). The identical local views $LS_{4,1}$=$LS_{4,2}$=ppn result in the global view $GS_5$=PPN. In transmission round 5, computer R3 sends a boot message for the first time, so that at the end of the next transmission round, round 6, it is already regarded as an applicant (A) in the global view. In this transmission round, both computers R1 and R2 can send member messages for the first time, since in the preceding transmission round, they were considered preliminary members in the global view. In transmission round 7, both computers R1 and R2 are members in the global view. The distributed computer network now has a majority of members.

This example illustrates how a hierarchy of computer states in which the computers can rise step by step from transmission round to transmission round is created by the method according to the invention. In the example just explained, a computer will rise in the global view only if a majority of the local views are in agreement. It may be advantageous, however, if a computer rises in the global view already when it is seen at the higher hierarchy level by a single computer which is considered a member in the global view. A majority vote is still required only for the rise to the globally highest hierarchy level (M). In this manner, the rise in the hierarchy can in many cases be speeded up.

If a computer is found to be faulty, it is preferably agreed that in the local views determined by the computers, it immediately descends to the lowest computer state, i.e., nonmember (n). A stepwise descent is also possible. To which hierarchy level the computer has to descend can be made dependent, for example, on the type of fault that has occurred, if this can be determined.

(Re)Admission of an individual computer to the distributed computer network is analogous to the sequence just described. How the last booting computer R3 is admitted to the computer network can be derived with the aid of FIG. 9. In transmission round 8 (not shown), computer R3 sends bind messages (bind) again. At the end of this round, it is already regarded as a preliminary member (p) in the global view. In transmission round 9, computer 3 sends member messages (mb), and in the next round, round 10, it is considered a member (m) in the global view.

It is to be understood that the use of the method according to the invention is not limited to distributed computer networks with three computers. It is a special advantage of the method that it is extremely flexible in terms of the number and type of computers, the underlying communications protocol, and the possible applications of the computer system. In particular, neither special hardware nor a specific operating system is required for the computers.

What is claimed is:

1. A method of determining a uniform global view (GS) of the system status of a distributed computer network (VRNW) comprising at least three computers (R1, R2, R3), the method comprising:

exchanging messages by the computers over communication links (KV12, KV13, KV32) in successive transmission rounds, with each of the computers receiving a message from each of the other computers in each transmission round in the absence of an error, wherein in each transmission round, each of the computers includes:

evaluating messages received from the other computers and, based on the result of the evaluation, assigning one of at least three differently defined computer states to each of the other computers, determining a local view ($LS_{i,j}$) of the system status therefrom, exchanging the local views of the system status determined, and determining a uniform global view of the system status from the local views exchanged, wherein the messages contain at least the following information:

(a) a message category (NK);
(b) the number (I) of the transmission round in which the message is sent;
(c) a local view ($LS_{i,j}$) of the system status, determined by the sending computer.

2. A distributed computer network (VRNW) comprising at least three computers (R1, R2, R3) and means for determining a uniform global view (GS) of the system status of the computer network, the distributed computer network comprising:

communication links (KV12, KV13, KV32 over which the computers exchange messages in successive transmission rounds, with each computer receiving a message from each of the other computers in each transmission round in the absence of an error, wherein each of the computers has a processor which evaluates the messages received from the other computers in a transmission round and, based on the result of the evaluation, assigns of at least three differently defined computer states to each of the other computers and determines a local view ($LS_{i,j}$) of the system status therefrom, and wherein the respective processor causes the computers to exchange the local views of the system status and determines a uniform global view of the system status from the local views exchanged, wherein the messages contain at least the following information:

(a) a message category (NK);
(b) the number (i) of the transmission round in which the message is sent;
(c) a local view ($LS_{i,j}$) of the system status, determined by the sending computer.

* * * * *